INVENTORS
George D. Legge &
Robert A. Sutton
BY D. L. Ellis
ATTORNEY

United States Patent Office 3,508,778
Patented Apr. 28, 1970

3,508,778
FLUSH TYPE DOOR HANDLE FOR
VEHICLE BODIES
George D. Legge, Farmington, and Robert A. Sutton, Southfield, Mich., assignors to General Motors Corporation, Detroit, Mich., a corporation of Delaware
Filed Nov. 21, 1968, Ser. No. 777,566
Int. Cl. E05b 3/00
U.S. Cl. 292—336.3                         6 Claims

ABSTRACT OF THE DISCLOSURE

A flush type outside operating vehicle body door handle pivotable on an escutcheon on the door between a flush inoperative position and an extended position operating the door latch is further provided with a manually operated handle latching member responsive to finger pressure on the gripping portion of the handle when it is swung to its extended position to hold the handle in such position thereby facilitating the application of door closing forces through the handle and specifically to accomplish the keyless locking function in the door latch.

---

This invention relates to vehicle body door handles and more particularly to flush type outside operating door handles for vehicle bodies.

The primary feature of this invention is in the provision of a flush type operating outside door handle for vehicle body doors and door latches and of the type including a finger gripping portion movable between a flush inoperative position and an extended operative position functional for release of a vehicle body door latch, with manually operable handle latching means being included to selectively positively maintain the handle in the operative extended position of the gripping portion such that door closing forces may be applied through the handle and to concurrently operate the vehicle body door latch key in a keyless locking mode thereof.

Another feature of this invention is in th use of a flush type handle according to the foregoing particularly comprising integrally formed or related thumb and finger gripping portions in the handle member and wherein the handle latching means may be selectively operated by manual pressure applied by the fingers on an operating agency mounted in the finger gripping portion of the handle member.

A further feature of the invention is in the case of a relatively uncomplicated and economical latching construction for the handle including a keeper pin formed in the handle escutcheon and engageable by a finger operable latching member pivotally mounted directly in the handle gripping portion and only when the handle is swung fully to its operative extended position relative to the escutcheon, means being provided to prevent this latching of the handle by such finger action until the operative position is reached thereby assuring that the consciously intended keyless locking of the vehicle body door latch will in fact be accomplished.

These and other features and advantages of the invention will be readily apparent from the following description and from the drawings wherein.

Figure 1:
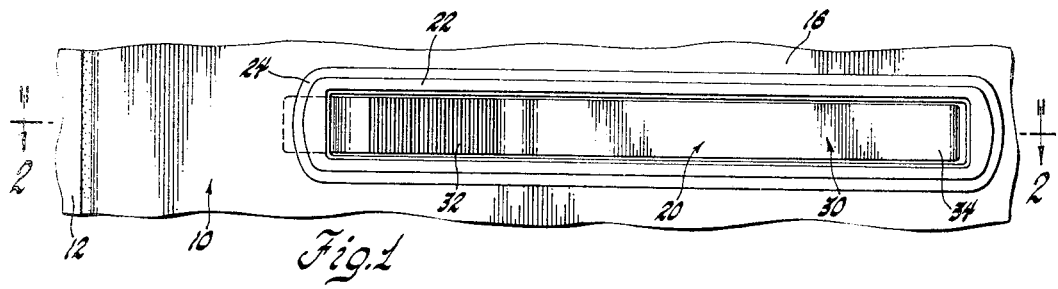
FIGURE 1 is a fragmentary side elevational view of a vehicle body door structure including a flush type outside operating door handle according to this invention.

Referring now particularly to FIGURE 1 of the drawings, the flush type outside operating door handle assembly according to the invention is shown mounted on a swingable vehicle body door 10 and particularly adjacent the rearward or free swinging edge portion thereof which in its fully closed position lies generally flushly adjacent a door pillar or jamb structure 12 of the vehicle body. Door 10 will be understood as being mounted by hinges adjacent the remote forward or other edge portion of the vehicle body for swinging movement away from the jamb 12 from the fully closed position shown to a fully opened position, not shown. It will be understood also that door 10 and jamb 12 are provided with a suitable latch and latch striker structure at this swinging edge portion to selectively hold and lock the door in the fully closed position. Such a latch structure may accord generally with the details disclosed in the Fox et al. Patent 3,190,682 issued June 22, 1965, and assigned to the assignee of the present invention.

As is typical with latches such as that of Fox et al. produced in vehicles of the assignee's manufacture, the latch structure includes the functional features of automatic undogging and keyless locking, referring respectively to the automatic cancellation during door closing movement of a manually selected locked condition in the door latch established prior to the door being slammed shut, and to the negation of such cancellation by conscious manipulation of such means as the outside door handle while so slamming the door shut thereby to maintain the latch in locked condition and avoid the necessity of replacing it in such condition by the use of an exterior key lock cylinder or other locking actuator.

It is not believed required that the structural and functional details of such latch and lock functions be further shown and described herein, but reference is made generally thereto by the appearance in the drawings of a latch release lever indicated generally at 14, such lever being adapted for operative association with an outside operating door handle assembly to accomplish the outside latch release and keyless locking functions for the latch. Such latch release lever is shown disposed adjacent the outer panel 16 of the door 10 and movable from a normal or rest position to an actuated position toward the door inner panel, not shown, to achieve the above noted functions in the door latch.

The flush type handle assembly of this invention, designated generally as 20, includes an escutcheon or housing 22 of narrow elongated and hollow configuration and received in a suitable aperture in the door outer panel 16 adjacent the latch release lever 14. The escutcheon includes a decorative outer flange or lip 24 overlying the margins of the outer panel aperture and the escutcheon is suitably secured to inner or reinforcing panel structure 26 of the door by screws threaded into integrally formed boss formations 28 of the escutcheon.

The escutcheon 22 has received between upper and lower walls thereof an elongated handle member 30, again of generally hollow three-walled construction and including integrally formed thumb and finger gripping portions 32 and 34. The handle member 30 is pivotally mounted in the escutcheon 22 by means of a pivot stud 36 press or otherwise securedly fitted in opposite aligned apertures in the top and bottom walls of the escutcheon and extending with rotation clearance through similarly aligned apertures in the hollow handle member 30. The handle member is thus swingable between an inoperative position, shown in FIGURE 2, wherein the gripping portion 34 lies substantially flush with the door outer panel 16 and within the confines of the escutcheon and with the push button or thumb portion 32 lying in a projecting position, and a fully extended or operative position shown in FIGURE 3. A coil torsion spring 38 wrapped about the pivot stud 36 and seated between the handle member and the escutcheon biases the handle member to the inoperative position of FIGURE 2. The range of travel between such positions as shown is planned with relation to the travel of the latch release lever 14 laterally toward the door inner panel from the normal position shown in FIGURE 2 to the latch operating position indicated in FIGURE 3 wherein the latch release lever operates on the door latch for release from the outside for door opening or for keyless locking while closing the door. In moving from the inoperative to the extended or operative position, handle member 30 picks up the latch release lever 14 through engagement therewith by a contoured or rounded cam surface 40 on the inner side of the handle thumb portion 32.

Figure 3:
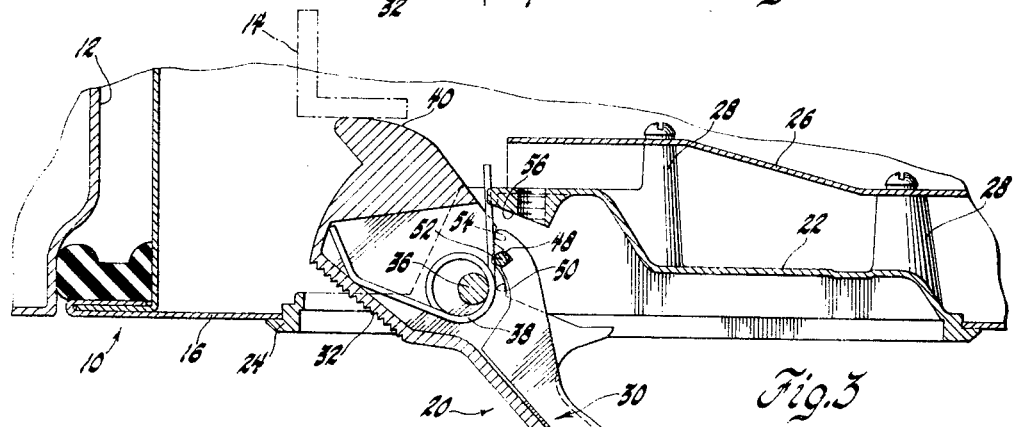
FIGURE 3 is a view similar to FIGURE 2 showing the handle latched in the operative extended position thereof.
Figure 4:
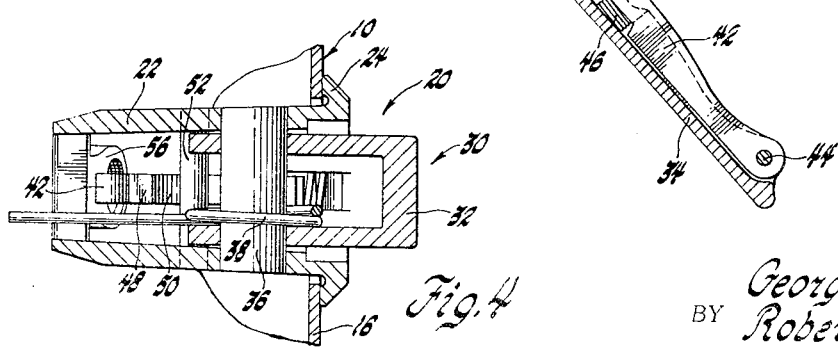
FIGURE 4 is an enlarged sectional view taken generally along the plane indicated by lines 4—4 of FIGURE 2.

In order to securely and positively maintain handle member 30 in its extended operative position shown in FIGURE 3, handle latching means are provided directly in the handle member and the escutcheon for response to selected conscious manual pressure applied to a portion of the handle. More particularly, an elongated latching member 42 is received intermediate the upper and lower walls of the handle member gripping portion 34 and has one end thereof pivoted by a pin 44 thereto. A coil compression spring 46 seats between the outer wall of the gripping portion and the latching member to urge the latter in a clockwise direction. Formed at the free or opposite end of the latching member is a latching formation including a shoulder 48 partially defined by a blocking surface 50. Cooperable with such latching formation is a keeper pin 52 extending vertically between the upper and lower walls of escutcheon 22 adjacent the portions of handle member 30 immediate to the pivot stud 36. Such portions include a shoulder 54 engageable with the keeper pin 52 to limit outward movement of the handle member and define an extreme operative position thereof.

Figure 2:
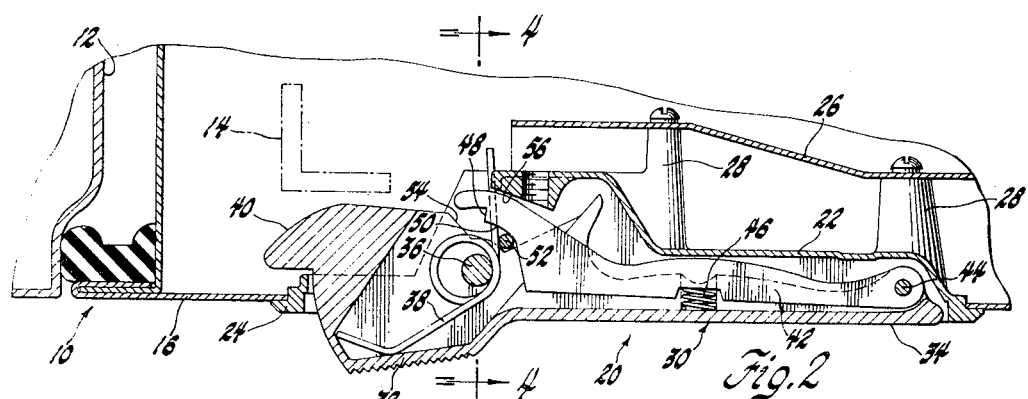
FIGURE 2 is a sectional view taken generally along the plane indicated by lines 2—2 of FIGURE 1 showing the handle in the flush inoperative position.

To operate the handle for actuation of the door latch, thumb pressure is applied to hollow handle member 32 swinging the handle member 30 clockwise about stud 36 from the inoperative position of FIGURE 2 to a position enabling grasping by the fingers of the gripping portion 34 whereupon further rotation of the handle member may be had by force applied to such gripping portion until reaching its fully swung or operative position shown in FIGURE 3, shoulder 54 and keeper pin 52 preventing further such rotation. The cam surface 40 in the meantime has picked up latch release lever 14 and caused full actuating movement thereof to release the door latch and allow movement of door 10 to the fully open position thereof. During this handle movement, latching member 42 is prevented from any extreme amount of clockwise pivoting by spring 46, due to sliding engagement of its latching formation and on a surface 56 of the escutcheon.

Assuming now that the door is in such fully open position and that it is desired to keyless lock the door latch through the use of the door handle assembly 20, it is seen that thumb pressure can be applied, if necessary, to again swing the handle member 30 to the operative position with respect to the door shown in FIGURE 3, whereupon the gripping portion 34 may be gripped by the fingers and forces applied therethrough to the handle in a direction to close the door 10. To keyless lock, it is of course necessary that such operative position of the handle shown in FIGURE 3 be maintained so that the latch release lever 14 will be held in its fully actuated position with respect to the door 10 shown in such figure and throughout the door closing movement. To insure this, finger pressure may be applied to the latching member 42 sufficiently to overcome the coil spring 38 to move the latching formation of such member to the position shown in FIGURE 3 wherein the shoulder 48 is engaged against the keeper pin 52. In such relation of the parts, handle member 30 is prevented from rotating about pivot 36 from this operative position counterclockwise back to its inoperative or flush position. Thus with finger pressure maintained on the latching member, the forces necessary for slamming of the door 10 and the concurrent actuation of the release lever 14 may be applied without any tendency of the handle member 30 to swing counterclockwise and perhaps allow the latch release lever to move slightly but sufficiently from its keyless locking or operating position to result in unwanted automatic undogging in the door latch. Once the door has been slammed shut and the keyless locking of the door accomplished, finger pressure may be released from the latching member 42 and the gripping portion 34 of the handle member thereby allowing torsion spring 38 to return the handle member to the inoperative position shown in FIGURE 2.

It is to be noted that the surface 50 of the latching formation of locking member 42 will insure conscious placement of the handle member 30 fully into its operative position of FIGURE 3 required for keyless locking, for until such operative position is reached the surface 50 prevents the consciously applied finger pressure on the latching member from in fact moving it to its latching position for engagement between the shoulder 48 and the lock pin 52.

Thus, when slamming the door 10 shut, the handle member 30 will have been moved sufficiently and completely to its operative position and the latch release lever will have been moved sufficiently to accomplish keyless locking cancelling the otherwise automatic undogging in the door latch.

Having thus described the invention, what is claimed is:

1. In a vehicle body including a door movable between fully open and fully closed positions and a door latch provided with automatic undogging and keyless locking features and having a latch release member, flush type operating door handle means comprising, a handle including a thumb portion and a finger gripping portion, means mounting said handle on said door for movement of said handle between an inoperative position wherein said gripping portion lies substantially flush with the door and an operative position wherein said handle operates said latch release member of said door latch and wherein said gripping portion extends from said door, means on said handle and on said door selectively operable in the operative position of said handle to positively hold the same therein in any position of said door between the fully open and fully closed positions thereof, and means on said handle responsive to manual pressure applied thereto when in said operative position thereof to operate said handle holding means whereby forces may be applied through said handle to move said door to said fully closed position thereof while concurrently operating said latch release member for keyless locking of the door latch.

2. The flush type operating door handle means recited in claim 1 wherein said manual pressure responsive means includes a member mounted in said gripping portion and responsive to finger pressure in the handle regions immediate thereto to operate said handle holding means.

3. In a vehicle body including a door movable between fully open and fully closed positions and a door latch having automatic undogging and keyless locking features and having a latch release member, flush type operating door handle means comprising, a handle including a thumb portion and a finger gripping portion, means mounting said handle on said door for movement of said handle between an inoperative position wherein said gripping portion lies substantially flush with the door and an operative position wherein said handle operates said latch release member of said door latch and wherein said gripping portion extends from said door, handle keeper means on said door, handle latching means on said handle engageable with said keeper means to hold said handle in the operative position thereof in any position of said door between said fully open and said fully closed positions thereof, and an operating member movably mounted on said handle gripping portion and responsive to finger pressure applied thereto in said operative position of said handle to move and cause engagement of said handle latching and said keeper means whereby forces may be applied through said handle to move said door to said fully closed position thereof while concurrently operating said latch release member for keyless locking of said door latch.

4. The flush type operating handle means recited in claim 3 further including means preventing said finger pressure responsive operating member from moving to engage said handle latching and said keeper means in all positions of said handle except said operative position thereof.

5. In a vehicle body including a door movable between fully open and fully closed positions and a door latch having automatic undogging and keyless locking features and having a latch release member, flush type operating door handle means comprising, a handle member including integral thumb and finger gripping portions, an escutcheon on said door, means pivotally mounting said handle member on said escutcheon for movement between an inoperative position wherein said gripping portion lies substantially flush with said door and an operative position, means for operatively connecting the thumb portion of said handle member with said latch release member, said handle member in the operative position thereof operating said latch release member and said gripping portion being in an extended position relative to said door, a keeper pin on said escutcheon, a handle latching member pivotally mounted on the gripping portion of said handle member for swinging movement between inoperative and latching positions relative thereto and including an abutment portion cooperable with said keeper pin, said latching member being responsive to finger pressure applied to said gripping portion in the operative position of said handle member to move from the inoperative position to the latching position thereof and into engagement with said keeper pin in any position of said door between fully open and fully closed positions to thereby latch said handle member in the operative position thereof, said latching member including a blocking portion engageable with said locking pin in all other positions of said handle member except said operative position to prevent movement of said latching member to said latching position thereof.

6. The flush type operating handle means recited in claim 5 wherein said keeper pin is further engageable with handle movement limiting structure on said handle member to define said operative position of the latter.

References Cited

UNITED STATES PATENTS

| | | | |
|---|---|---|---|
| 2,029,199 | 1/1936 | Segar | 292—173 |
| 2,613,971 | 10/1952 | Goserud | 292—207 X |
| 3,020,075 | 2/1962 | Johnstone | 292—336.3 |

RICHARD E. MOORE, Primary Examiner

E. J. McCARTHY, Assistant Examiner